United States Patent [19]

Stuart

[11] Patent Number: 4,493,654
[45] Date of Patent: Jan. 15, 1985

[54] EDUCATIONAL DEVICE

[76] Inventor: Marion W. Stuart, 2122 E. 6550 South, Uintah, Utah 84405

[21] Appl. No.: 595,719

[22] Filed: Apr. 2, 1984

[51] Int. Cl.³ .............................................. G09B 3/12
[52] U.S. Cl. ................................... 434/347; 434/156
[58] Field of Search .............. 434/327, 322, 347, 156, 434/260, 191, 209, 83; 235/61 B

[56] References Cited

U.S. PATENT DOCUMENTS

| | | | |
|---|---|---|---|
| 680,411 | 8/1901 | Dockery | 434/209 X |
| 2,296,799 | 9/1942 | Rosin | 235/61 B |
| 2,385,197 | 9/1945 | Eisel | 434/260 |
| 2,529,413 | 11/1950 | Peterson | 434/83 |
| 2,728,149 | 12/1955 | Radt | 434/83 |
| 2,901,839 | 9/1959 | Huff | 434/209 X |
| 2,932,908 | 4/1960 | Gough | 434/327 |
| 2,949,681 | 8/1960 | Knefeli | 434/191 |
| 3,451,879 | 6/1969 | Fuller | 434/83 X |
| 3,604,127 | 9/1971 | Howatt | 434/327 |
| 3,624,922 | 12/1971 | Rich | 434/345 |
| 4,078,318 | 3/1978 | Shivers | 434/209 X |

FOREIGN PATENT DOCUMENTS 754314  3/1967  Canada ............................... 434/322

Primary Examiner—William H. Grieb
Attorney, Agent, or Firm—K. S. Cornaby

[57] ABSTRACT

This invention relates to an educational device having a card with notched edges and a series of numbers or words along each longitudinal edge of the card corresponding to each notch. The correct answer to a problem from one edge of the card, whether arithmetic or grammatical or historical, is found on the opposite edge of the card. A string member is used to connect the problem on one edge of the card with the correct answer on the other edge. The reverse side of the card has the correct string lines imprinted thereon corresponding to the correct placement of the string member for the correct answers to the problems on the face side of the card.

9 Claims, 5 Drawing Figures

1

EDUCATIONAL DEVICE

BACKGROUND OF THE INVENTION

Many educational tools have been developed to aid in teaching children arithmetic, grammar, languages, history and other standard essentials in elementary and high school curricula. Oftentimes these tools incorporate hand manipulations, eye coordinative exercises and other game-like features which appeal to children and increase their interest and desire to learn, particularly those important arithmetic and grammar relationships that require rote memorization.

Significant innovations in this field include those disclosed in U.S. Pat. Nos. 2,901,839; 2,529,413; 2,728,149; 4,078,318; 2,949,681; 3,451,879; and 680,411. Several of these patents disclose the use of string-like members to be wound about an object or card to form geographical objects or to play games; while others disclose specific games or devices for teaching arithmetical or grammatical relationships.

It is an objective of this invention to provide a teaching device for teaching children the relationships important to arithmetic, grammar, history and other necessary educational subjects.

It is a further objective to provide an educational device using a card and a string to aid in teaching educational information to children.

It is an additional objective of this invention to provide an educational device for teaching educational relationships to children which is capable to permitting the user to check immediately the correctness of the answers

SUMMARY OF THE INVENTION

The above and further objectives are met by this invention which has a preferably oblong card of stiff material having a plurality of notches along each opposing, longitudinal lateral edge of the card. A series of arithmetic problems, word relationships, music symbols, words or notation, or other educational information is listed along one edge of the card with each problem, word or other problem placed adjacent to a notch. Along the opposite edge of the card, the answers to the arithmetical problems, word relationships or other information are listed in random order alongside each notch. A length of string-like material is attached to the cord so that it can be wound from notch to notch across the face and back of the card in such a fashion that the string can lead from the problem notch on one edge of the cord to the correct answer notch on the opposite edge. When the string is wound around the card connecting all notches, the exercise is complete.

The reverse side of the card has lines imprinted thereon corresponding to the correct placement of the string as it traverses the reverse side to connect the correct answers with the appropriate problems on the face of the card. Thus, the user can immediately check to see if the answers to the problems on the face of the card are correct by merely turning the card over and determining if all of the imprinted lines are traversed by a string segment.

THE DRAWING

Several preferred embodiments of the invention are illustrated in the accompanying drawings, in which.

DETAILED DESCRIPTION OF THE ILLUSTRATED EMBODIMENTS

Figure 1:
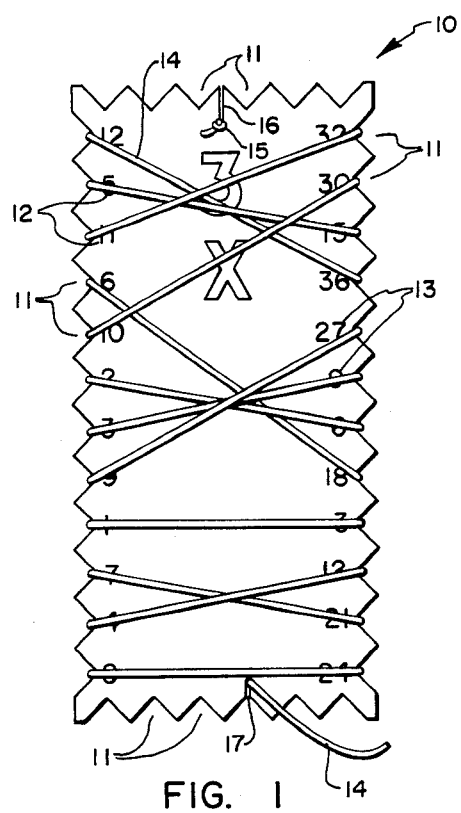
FIG. 1 is a front elevational view of an embodiment of the invention showing the string in place on a card teaching the three times table in arithmetic.
Figure 2:
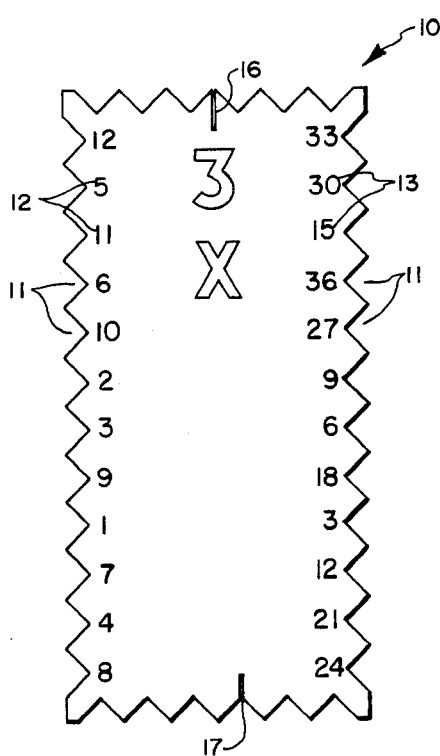
FIG. 2 is a front elevational view of the card shown in FIG. 1 without the string in place across the face of the card.
Figure 3:
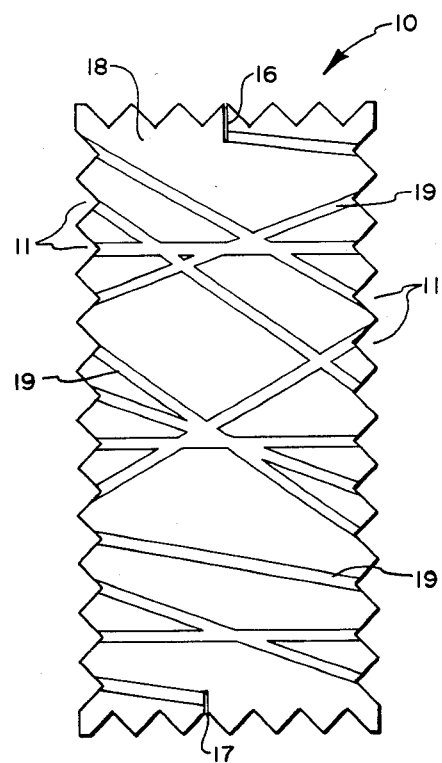
FIG. 3 is a rear elevational view of the card shown in FIG. 2, showing the reverse side of the card with the correct answer lines imprinted thereon.

As shown in FIGS. 1, 2 and 3, a preferred embodiment of the invention has a rectangular card member 10, preferably about 4×2 inches in dimension. Card member 10 has a plurality of notches 11 at least along both longitudinal edges of card 10. In these figures, the shorter edges of card 10 are shown with notches 11 as an alternative embodiment.

Card member 10 is preferably constructed of a rigid material, such as cardboard, plastic, wood, metal, or the like, capable of having notches 11 cut or molded into the edges thereof. The thickness of card member 10 is preferably about ⅛ inch, but is limited only in its ability to withstand repeated use and remaining relatively light weight for children.

FIGS. 1 and 2 show a specific example of the invention being used to teach the three times table in arithmetic. A plurality of numbers 12 are placed on the left-hand side or edge of the card 10, with each number being placed next to a notch 11. Any numbers 12 can be used for placement on the left-hand edge of card 10.

The right-hand edge of card 10 has a plurality of numbers 13 with each number being placed next to a notch 11. However, each number 13 must be the quotient of one of the left-hand numbers 12 multiplied by three. The arrangement of the numbers 12, 13 on either edge of card 10 is arbitrary, so long as the right-hand numbers are quotients of three times the left-hand numbers.

A string member 14 is attached at one end thereof to card 10, as, for example, is illustrated in FIG. 1 with a small knot 15 tied in the end of string member 14 and engaged in a slot 16 at the top of card 10. String member 14 can be constructed of any elongate, flexible material, such as cotton or hemp string or cording, or any other suitable material. As the string member 14 wears out through repeated use, it is easily replaced.

In use string member 14 is extended preferably behind card 10 to the first, uppermost notch 11 on the left-hand edge of card 10. That notch 11 corresponds in FIG. 1 to the number 12. The choice facing the child is what is the correct answer for 3×12? As the child peruses the right-hand numbers 13, he or she sees the number 36, which is the fourth number 13 from the top on the right hand edge. In determining that the number 36 is the correct answer the child extends string 14 across the face of card 10 and around the corresponding notch 11 to the backside of card 10. From there string 14 is extended back to the second notch 11 from the top on the left-hand side, and the process is repeated until all of the numbers 12 on the left-hand edge have been paired with the correct answer on the right-hand side, as is illustrated in FIG. 1. For ease of retaining string 14 in place, the end can be secured in another slot 17 at the bottom of card 10.

As FIG. 1 illustrates, the child has solved each problem and can clearly see the answer to the 3× multiplication table by following the string member 14 across from the number 12 on the left to the answer 13 on the right in each case.

FIG. 3 illustrates the reverse side 18 of card 10 for checking the correctness of the user's answers. A plurality of lines 19 are imprinted on the reverse side 18 showing the location of string member 14 for each correct answer to the 3× multiplication table on the face side of card 10. If an incorrect answer has been made on the face side of card 10, string member 14 will be out of place with reference to the correct line 19 for that particular problem. Accordingly, a child can check immediately the correctness of the answers by merely turning the card 10 over to show the reverse side 18 and determining if all lines 19 are covered by string number 14.

Figures 4, 5:
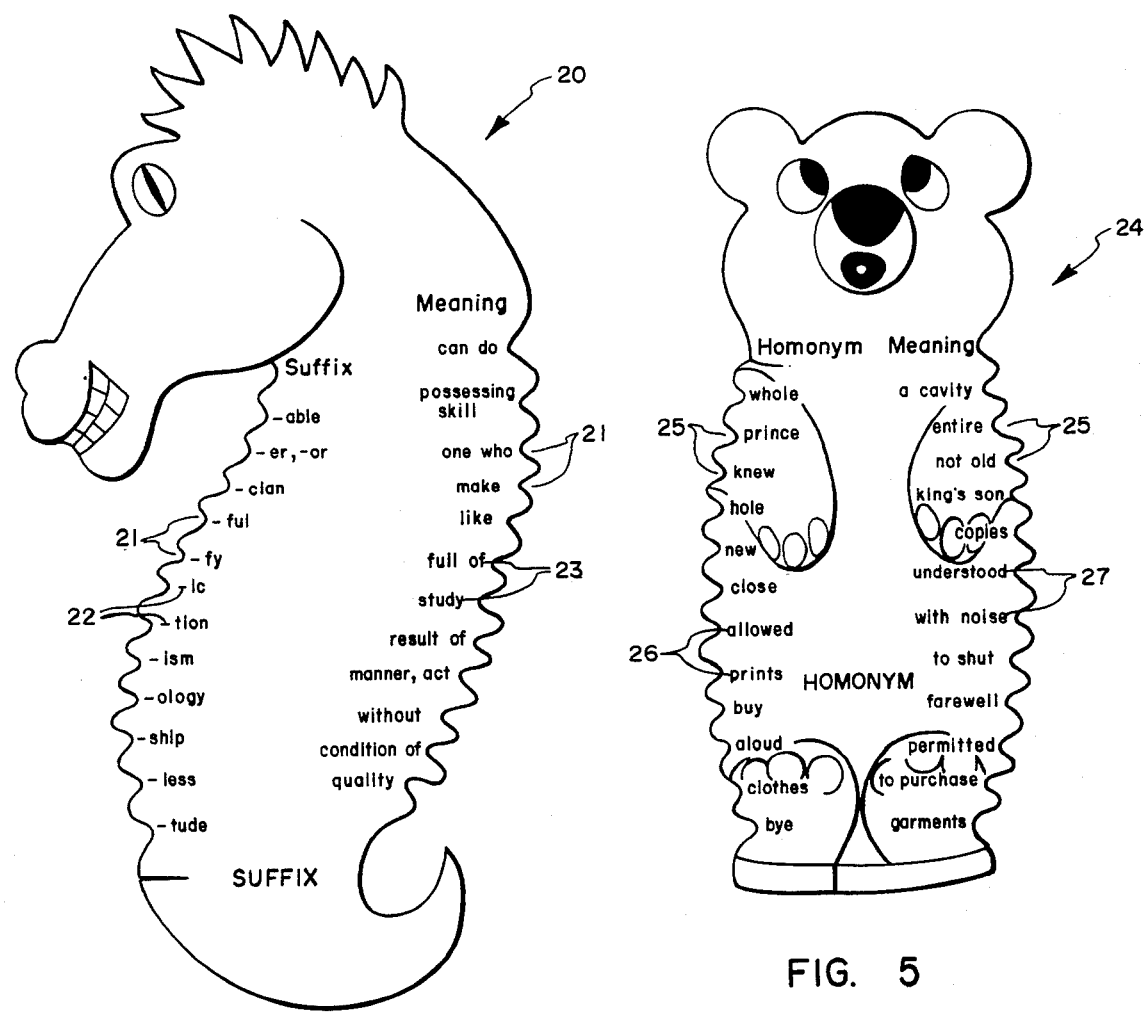
FIG. 4 is a front elevational view of another embodiment of the invention showing a card having the shape of a seahorse and illustrating the definitions of suffixes in English grammar.
FIG. 5 is a front elevational view of yet another embodiment showing a card having the shape of a bear and illustrating the definitions of homonyms in English grammar.

An alternative preferred embodiment of the invention is shown in FIG. 4, in which a card 20 in the shape of a seahorse is provided with a plurality of notches 21 along both longitudinal edges of card 20. In this embodiment a grammar teaching aid is provided for teaching the meanings of a selection of suffixes. The suffixes 22 are listed along the left-hand edge of card 20, with each suffix 22 being listed next to a notch 21. On the opposite, right-hand edge, the meanings 23 are listed with each meaning being next to a notch 21. The card 20 is used in the same manner as illustrated for the first embodiment in FIGS. 1–3, above. A string (not shown) is attached and similarly wound from one side to the other, with the reverse side (not shown) having the correct lines imprinted thereon.

Another alternative preferred embodiment is illustrated in FIG. 5, in which a card 24 in the shape of a bear is provided with a plurality of notches 25 along both longitudinal edges of card 24. In this embodiment, a grammar teaching aid is. provided for teaching the meanings of a selection of homonyms. The homonyms 26 are listed along the left-hand edges of card 24, with each homonym 26 being placed next to a notch 25. On the opposite right-hand edge of card 24, the meanings 27 of the homonym 26 are listed with each homonym being placed next to a notch 25.

Card 24 is used in the same manner as illustrated for the above embodiments shown in FIGS. 1–4, above. A string (not shown) is attached and similarly wound from one side to the other, with the reverse side of card 24 (not shown) having the correct lines imprinted thereon.

While this invention has been illustrated and described with respect to several preferred embodiments, it will be understood that there are other embodiments which are clearly within the scope of the invention, which is limited only by the scope of the appended claims.

I claim:

1. Educational device for teaching informational relationships, comprising in combination:
    card means having at least two mutually opposing edges, a face and a rear side, each edge having a plurality of notches along the length thereof;
    a plurality of problems arranged respectively next to said notches along one of said opposing edges of the face of said card;
    a plurality of answers arranged respectively next to said notches along the opposite one of said opposing card edges, said answers comprising correct solutions to each of said corresponding problems on the opposing card edge;
    elongate string means for extending from a notch on one edge to another notch on the opposing edge of said card means; and
    a plurality of line indicators on said rear side of said card corresponding to the placement of said string means across said card rear side representing the correct answers to said problems.

2. Educational device as set forth in claim 1, wherein said card means is rectangular in shape.

3. Educational device as set forth in claim 1, wherein said card means has the shape of an animal.

4. Educational device as set forth in claim 1, wherein said card means is constructed of plastic material.

5. Educational device as set forth in number problems and number answers on the card face.

6. Educational device as set forth in claim 1, wherein said card means has grammar problems and answers on the card face.

7. Educational device as set forth in claim 4, wherein said string means is attached at one end thereof to said card means.

8. Educational device as set forth in claim 1, wherein said problems and answers are arithmetical multiplication tables and answers.

9. Educational device as set forth in claim 1, wherein said problem and answers are arithmetical division problems and answers.

* * * * *